United States Patent [19]
Aoki

[11] Patent Number: 5,838,499
[45] Date of Patent: Nov. 17, 1998

[54] TELEPHOTO ZOOM LENS SYSTEM

[75] Inventor: Masayuki Aoki, Oyama, Japan

[73] Assignee: Nikon Corporation, Tokyo, Japan

[21] Appl. No.: 842,154

[22] Filed: Apr. 23, 1997

[30] Foreign Application Priority Data

Apr. 24, 1996 [JP] Japan ................................. 8-129002

[51] Int. Cl.$^6$ .................................................. G02B 15/14
[52] U.S. Cl. ........................... 359/676; 359/683; 359/685
[58] Field of Search ..................... 359/676, 683, 359/685, 695, 745, 746, 763, 764

[56] References Cited

U.S. PATENT DOCUMENTS

| | | | |
|---|---|---|---|
| 4,830,477 | 5/1989 | Takahashi et al. | 359/683 |
| 5,126,883 | 6/1992 | Sato et al. | 359/685 |
| 5,508,847 | 4/1996 | Suzuki et al. | 359/683 |
| 5,532,881 | 7/1996 | Nakatsuji et al. | 359/683 |
| 5,630,181 | 5/1997 | Ohtake | 359/676 |

*Primary Examiner*—Georgia Y. Epps
*Assistant Examiner*—Jordan M. Schwartz
*Attorney, Agent, or Firm*—Michael N. Meller

[57] ABSTRACT

A telephoto zoom lens system includes in order from an object side:

a first lens group $G_1$ having a positive refractive power;

a second lens group $G_2$ having a negative refractive power;

a third lens group $G_3$ having a negative refractive power;

a fourth lens group $G_4$ having a positive refractive power; and a fifth lens group $G_5$ having a negative refractive power.

When zooming from the wide-angle end to the telephoto end, the distance between each of the adjacent lens groups changes. The second lens group $G_2$, when zooming from the wide-angle end to the telephoto end, first moves from the wide-angle end position toward the object side, then moves toward the image side, and once again moves toward the object side to reach the telephoto end. The second lens group $G_2$ is positioned closer to the image side at its telephoto end than it is at its wide-angle end.

22 Claims, 15 Drawing Sheets

TELEPHOTO ZOOM LENS SYSTEM

BACKGROUND OF THE INVENTION

The present invention relates to a zoom lens system for photography and video use.

Lately, as the demand grows for compact, high performance zoom lenses with more sophisticated specifications, a variety of types of zoom lenses have been proposed. One of the popular zoom lenses is a conventional zoom lens having a positive/negative/positive/positive construction having an afocal zoom converter having a positive/negative/positive construction. Nevertheless, the four lens group zoom type performs zooming using only the second lens group. Therefore, it is inevitable that the negative refractive power be increased in order to increase the magnification, thus causing a problem in the aberration correction. In addition, in the four lens group, the fact that the first and the fourth lens groups are fixed while zooming is performed, makes the entire length constant throughout the zoom range. This is disadvantageous in attempting to decrease the size and weight of the zoom lens.

A variety of zoom lens in which three or more lens groups move when zooming is performed have been proposed. However, none of them have satisfactorily provided a compact, high performance zoom lens with more sophisticated specifications.

SUMMARY OF THE INVENTION

Therefore, it is an object of the present invention to provide a zoom lens used in photography or video in the telephoto range, specifically a telephoto zoom lens system of compact, large aperture, high performance with more sophisticated specifications.

The present invention resolved the problem by configuring a zoom lens system comprising, in order from an object side:

a first lens group $G_1$ having a positive refractive power;

a second lens group $G_2$ having a negative refractive power;

a third lens group $G_3$ having a negative refractive power;

a fourth lens group $G_4$ having a positive refractive power;

a fifth lens group $G_5$ having a negative refractive power;

wherein when zooming from the wide-angle end to the telephoto end, the distance between each of the adjacent lens groups changes;

the second lens group $G_2$, when zooming from the wide-angle end to the telephoto end, first moves from the wide-angle end position toward the object side, then moves toward the image side, and once again moves toward the object side to reach the telephoto end; and the second lens group $G_2$ is positioned closer to the image side at its telephoto end than it is at its wide-angle end.

The zoom lens system incorporating the principles of the present invention uses the zoom type in which all of the five lens groups are able to be moved when zooming is performed. Each of the lens group is configured such that, at the image side, the so-called telephoto type two, positive and negative lens groups, are arranged to reduce the entire lens length while three, positive, negative, negative groups, are arranged at the object side: the lens system as a whole is configured with five lens groups, in order from the object side, positive, negative, negative, positive and negative.

With this configuration, reduction in size can be performed particularly at the wide-angle end. Also when zooming, the fact that there are many movable lens groups not only make high magnification possible but also make excellent aberration corrections possible. Particularly, the aberration fluctuation is minimized during zooming to obtain a high imaging performance throughout the zoom regions by moving the second lens group $G_2$ in the following manner: When zooming from the wide-angle end to the telephoto end, $G_2$ moves from the wide-angle end to the object side, then moves toward the image side, and once again moves toward the object side to reach the telephoto end; and the second lens group $G_2$ is positioned closer to the image side at its telephoto end than it is at its wide-angle end.

Also, it is desirable that the lens system incorporating the principles of the present invention satisfies one of the following conditions:

$$|\Delta X_{M1}|/(f_{M1}-f_W)<0.2 \tag{1}$$

$$|\Delta X_{M3}|/(f_T-f_{M3})<0.2 \tag{2}$$

where $f_W$ is the focal length of the entire zoom lens system at the wide-angle end;

$f_T$ is the focal length of the entire zoom lens system at the telephoto end;

$f_{M1}$ is the focal length of the entire zoom lens system when the second lens group $G_2$ is moved closest to the object side;

$f_{M3}$ is the focal length of the entire zoom lens system when the second lens group $G_2$ is moved to the position closest to the image side;

$\Delta X_{M3}$ is the distance between the positions to which the second lens group $G_2$ is moved, one being the wide-angle end and the other being closest to the object side; and $\Delta X_{M3}$ is the distance between the positions to which the second lens group $G_2$ is moved, one being the telephoto end and the other being closest to the image side.

The above conditions (1) and (2) are the conditions that optimize the parameters for the mid-focal length range between the wide-angle end and the telephoto end to provide excellent imaging performance by appropriately moving the second lens group $G_2$. When the second lens group $G_2$ is moved more toward the object side, in the mid-focal length range which is closer to the wide-angle end, both the spherical aberration and the image curvature moves toward minus, particularly, the image curvature moves greatly. In the mid-focal length range which is closer to the telephoto end, if $G_2$ is moved more toward the image side, the spherical aberration moves toward plus while the image curvature moves toward minus and the spherical aberration moves particularly greatly. The apparatus incorporating the principles of the present invention takes advantage of such aberration characteristics to provide a high imaging performance in the mid-focal length range.

When the value is over the upper limit of the condition (1) in the mid-focal length range which is closer to the wide-angle end, the image curvature excessively moves toward minus, lowering the imaging performance of the peripherals within the screen.

When the value is over the upper limit of condition (2), spherical aberrations excessively shift toward plus, lowering the imaging performance with respect to the object at a far distance in the entire screen.

In the apparatus incorporating the principles of the present invention, it is also preferable that at least one of the following conditions is satisfied:

$$2.0 < F_T \cdot f_1/f_T < 3.6 \quad (3)$$

$$1.0 < f_2/f_3 < 2.0 \quad (4)$$

$$0.6 < |f_{W23}|/f_W < 1.2 \quad (5)$$

$$0.6 < f_4/|f_5| < 1.2 \quad (6)$$

where $f_W$ is the focal length of the entire zoom lens system at the wide-angle end;

$f_T$ is the focal length of the entire zoom lens system at the telephoto end;

$f_1$ is the focal length of the first lens group $G_1$;

$f_2$ is the focal length of the second lens group $G_2$;

$f_3$ is the focal length of the third lens group $G_3$;

$f_4$ is the focal length of the fourth lens group $G_4$;

$f_5$ is the focal length of the fifth lens group $G_5$;

$f_{W23}$ is the synthetic focal length of the second lens group $G_2$ and the third lens group $G_3$ at the wide-angle end; and $F_T$ is the F-number at the telephoto end.

Condition (3) is the condition which provides an appropriate F-number for the first lens group $G_1$ at the telephoto end. When the value exceeds the upper limit of the condition (3), the focal length of the first lens group $G_1$ becomes longer than it should, increasing displacement amount of the first lens group $G_1$ during focusing, consequently making miniaturization and weight reduction impossible. The value below the lower limit of the condition (3) makes the focal length of the first lens group $G_1$ shorter than it should be, losing control of variable aberrations at the telephoto end during focusing, adversely lowering the imaging performance.

Condition (4) is the condition which provides an appropriate ratio of the focal length of the second lens group $G_2$ to the focal length of the third lens group $G_3$. The values exceeding either the upper limit or lower limit of the condition (4) cause unfavorable results in that the coma aberration deviates to a large degree during zooming and the spherical aberration is corrected excessively at the telephoto end.

Condition (5) is the condition which provides an appropriate ratio of the synthetic focal length of the second lens group $G_2$ and the third lens group $G_3$ at the wide-angle end to the focal length of the entire lens system at the wide-angle end. The values exceeding the upper limit of the condition (5) make it difficult to obtain a needed sufficient back focus at the wide-angle end. Alternatively, the values below the lower limit of the condition (5) increase the lens diameters of the fourth lens group $G_4$ and the fifth lens group $G_5$, making miniaturization difficult.

Condition (6) is the condition which provides an appropriate ratio of the fourth lens group $G_4$ focal length to the fifth lens group $G_5$ focal length. The values exceeding the upper limit of the condition (6) shorten the focal length of the fifth lens group $G_5$ too much, giving a large negative Petzval sum value, as a result, failing to provide an excellent imaging performance. Alternatively, the values below the lower limit of the condition (6) shorten the focal length of the fourth lens group $G_4$ too much, enlarging the spherical aberration and coma aberration throughout the entire zoom range, lowering imaging performance.

BRIEF DESCRIPTION OF THE DRAWINGS

The above and other objects, features, and advantages of the present invention will become more apparent from the following detailed description taken with the accompanying drawings, in which.

DESCRIPTION OF THE PREFERRED EMBODIMENTS

Figure 1:
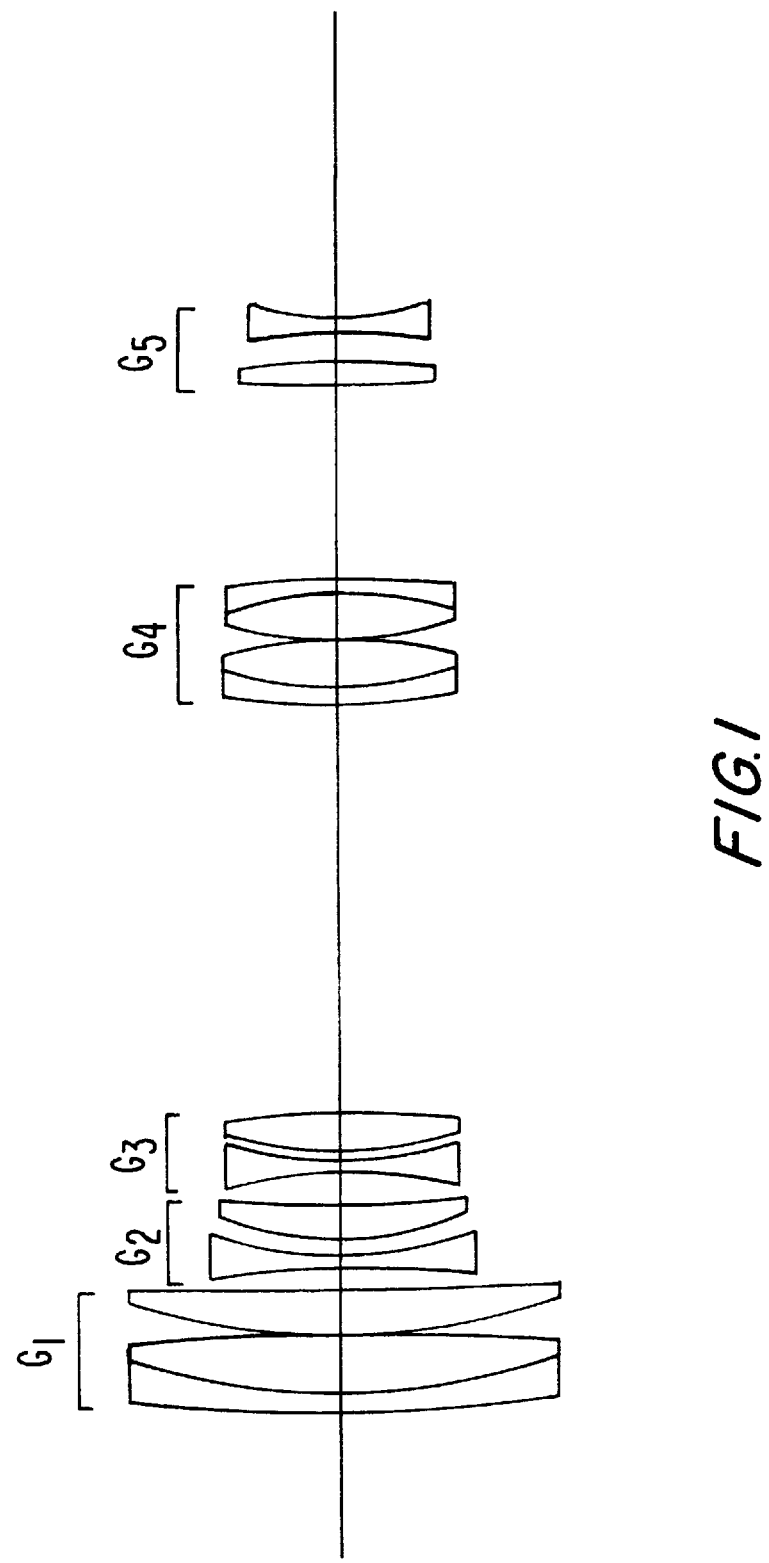
FIG. 1 is a block diagram illustrating the layout of the lenses of a first embodiment of the zoom lens system incorporating the principles of the present invention.
Figure 6:
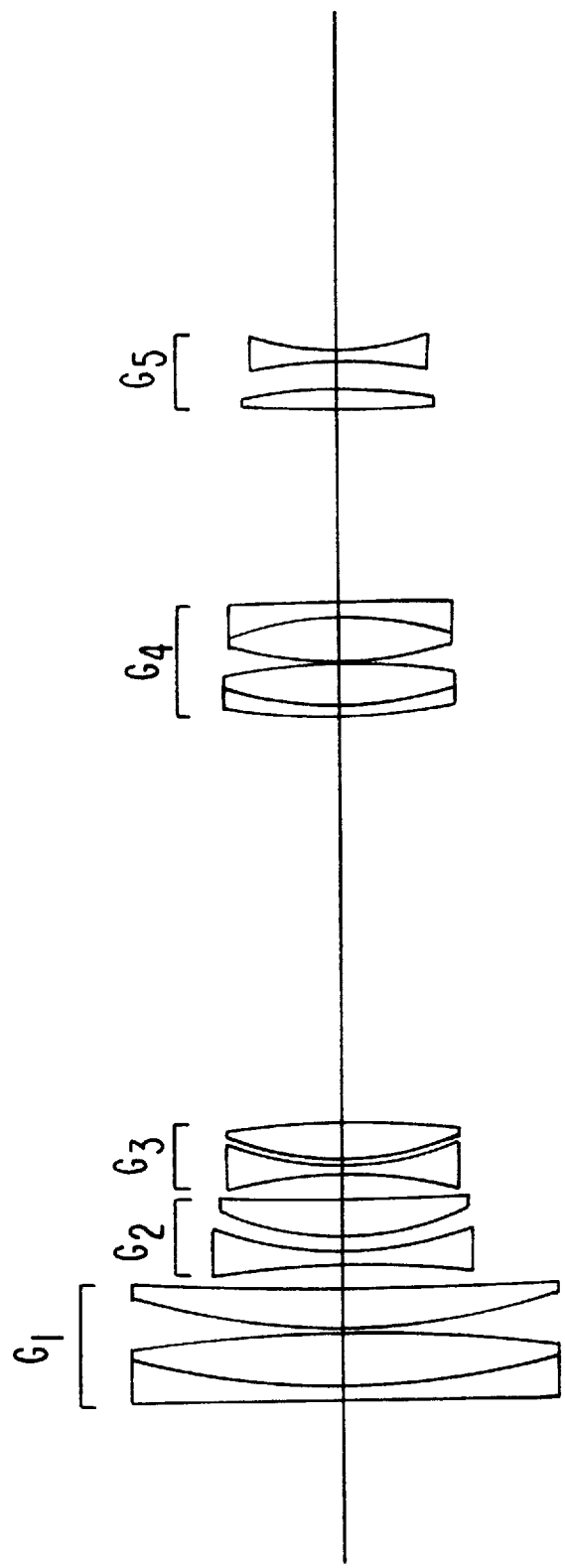
FIG. 6 is a block diagram illustrating a layout of the lenses of a second embodiment of the zoom lens system incorporating the principles of the present invention.
Figure 11:
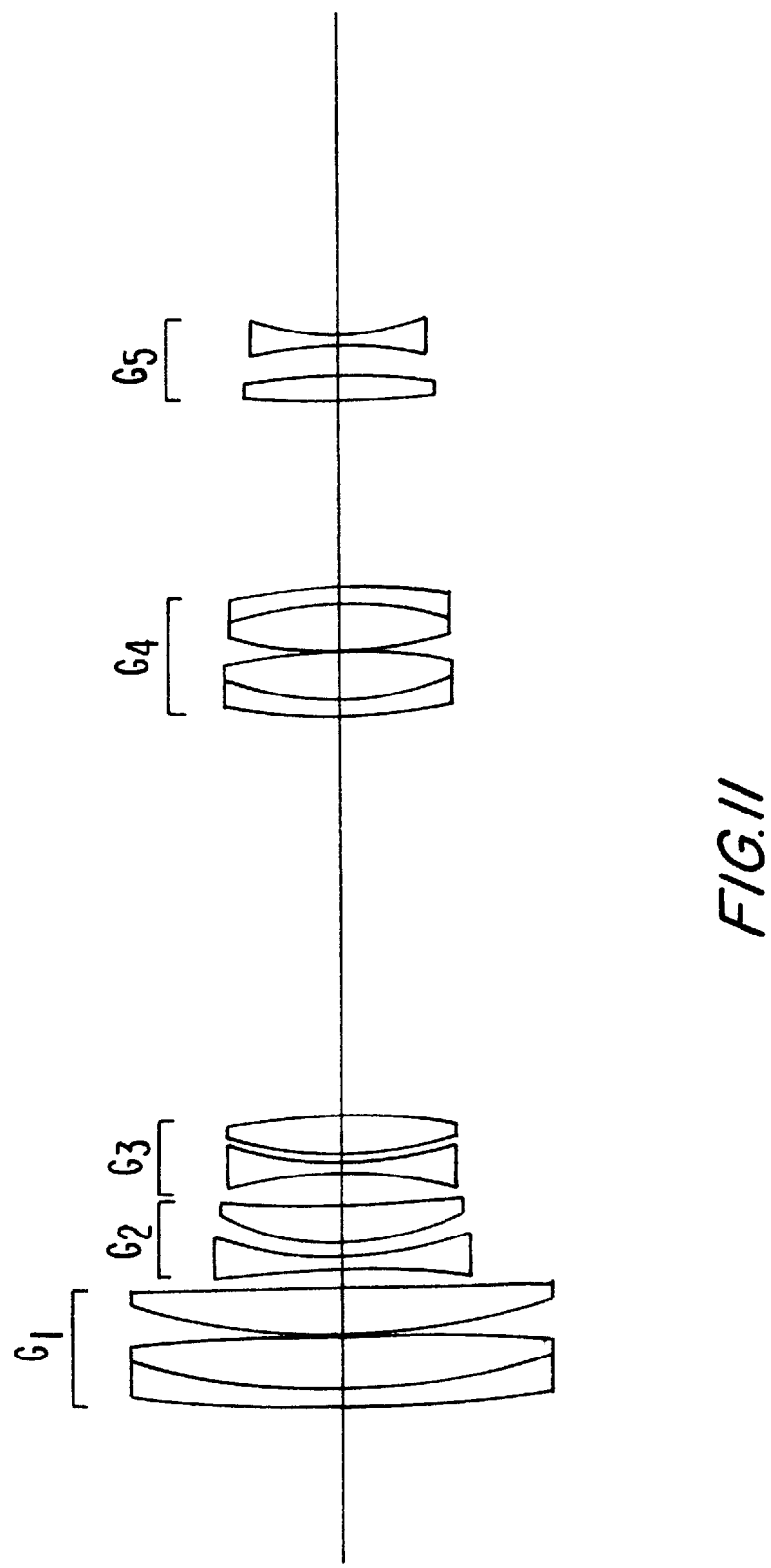
FIG. 11 is a block diagram illustrating a layout of the lenses of a third embodiment of the zoom lens system incorporating the principles of the present invention.

Referring to the drawings, FIGS. 1, 6, and 11 are lens block diagrams of the first, second, and third embodiments of the zoom lens system incorporating the principles of the present invention. Each of the embodiments is a zoom lens system comprising, in order from an object side: a first lens group $G_1$, having a positive refractive power, a second lens group $G_2$ having a negative refractive power, a third lens group $G_3$ having a negative refractive power, a fourth lens group $G_4$ having a positive refractive power, and a fifth lens group $G_5$ having a negative refractive power. The telephoto zoom lens of each of the embodiments changes all of the distances between each of the adjacent lens groups when zooming from the wide-angle end to the telephoto end. Among them, the second lens group $G_2$, when zooming from the wide-angle end to the telephoto end, first moves from the wide-angle end toward the object side, then moves toward the image side, and once again moves toward the object side to reach the telephoto end. In addition, the second lens group $G_2$ moves such that its position at the telephoto end is closer to the image side than it is at the wide-angle end.

Values for the first through third embodiments are shown in tables 1, 2, and 3 herein. In the "Parameters" tables, numbers in the "Number" column show the numbers given to each of the lens surfaces from the object side; r in the second column shows the radius of curvature of each of the lens surfaces; d in the third column is the lens surface separation; ν in the fourth column is the Abbe number based on the d-line ($\lambda$=587.6 nm) of each of the lenses; $n_d$ in the fifth column is the refractive index of each of the lenses to the d-line, and Bf is the back focal point.

TABLE 1

Values of Items f = 71.4 to 292.0 mm  $F_{NO}$ = 4.09 to 5.53
$f_1$ = 147.11810   $f_2$ = −169.99904   $f_3$ = −103.55842
$f_4$ = 46.22031    $f_5$ = −50.00000

Parameters

| Number | r | d | ν | $n_d$ |
|---|---|---|---|---|
| 1 | 224.7490 | 2.2000 | 33.89 | 1.803840 |
| 2 | 92.0937 | 6.8000 | 82.52 | 1.497820 |
| 3 | −550.3617 | 0.4000 | | |
| 4 | 91.6817 | 5.8000 | 64.10 | 1.516800 |
| 5 | −18681.3270 | ($d_5$) | | |
| 6 | −160.9857 | 1.7000 | 40.90 | 1.796310 |
| 7 | 46.9216 | 2.0000 | | |
| 8 | 36.7135 | 4.6000 | 29.46 | 1.717360 |
| 9 | 172.5753 | ($d_9$) | | |
| 10 | −59.4804 | 1.5000 | 40.90 | 1.796310 |
| 11 | 52.9553 | 1.6000 | | |
| 12 | 70.5629 | 4.4000 | 29.46 | 1.717360 |
| 13 | −96.5590 | ($d_{13}$) | | |
| 14 | 75.0532 | 2.0000 | 25.50 | 1.804581 |
| 15 | 41.7904 | 6.2000 | 60.23 | 1.518350 |
| 16 | −69.5820 | 0.2000 | | |
| 17 | 51.0132 | 6.0000 | 60.69 | 1.563840 |
| 18 | −46.4295 | 1.5000 | 33.89 | 1.803840 |
| 19 | −162.7886 | ($d_{19}$) | | |
| 20 | 206.6818 | 3.0000 | 27.83 | 1.699110 |
| 21 | −74.4635 | 3.8000 | | |
| 22 | −69.0975 | 1.5000 | 49.45 | 1.772789 |
| 23 | 32.9492 | (Bf) | | |

Variable Space in Variable Power

| | Wide-Angle End | $M_1$ | $M_2$ | $M_3$ | Telephoto End |
|---|---|---|---|---|---|
| f | 71.40000 | 92.00000 | 150.00000 | 247.09000 | 292.00000 |
| $d_5$ | 2.24712 | 10.61626 | 30.07192 | 58.68750 | 70.04645 |
| $d_9$ | 4.05926 | 8.39595 | 14.10191 | 12.54309 | 6.81040 |
| $d_{13}$ | 51.36844 | 40.91408 | 19.66089 | 3.07721 | 3.68437 |
| $d_{19}$ | 24.71155 | 22.46008 | 18.55166 | 8.07856 | 1.84516 |
| Bf | 40.27826 | 49.45647 | 64.46699 | 82.19061 | 95.48094 |

TABLE 2

Values of Items f = 76.5 to 292.0 mm  $F_{NO}$ = 4.32 to 5.53
$f_1$ = 150.00013   $f_2$ = −169.99896   $f_3$ = −117.33623
$f_4$ = 47.74552    $f_5$ = −51.67899

Parameters

| Number | r | d | ν | $n_d$ |
|---|---|---|---|---|
| 1 | 1123.1244 | 1.8000 | 33.89 | 1.803840 |
| 2 | 97.4547 | 6.8000 | 82.52 | 1.497820 |
| 3 | −205.4845 | 0.4000 | | |
| 4 | 86.0326 | 5.3000 | 47.10 | 1.623741 |
| 5 | 900.3396 | ($d_5$) | | |
| 6 | −127.9906 | 1.7000 | 40.90 | 1.796310 |
| 7 | 47.2914 | 2.0000 | | |
| 8 | 36.5856 | 4.6000 | 32.17 | 1.672700 |
| 9 | 345.3175 | ($d_9$) | | |
| 10 | −65.2137 | 1.5000 | 40.90 | 1.796310 |
| 11 | 47.4724 | 1.0000 | | |
| 12 | 58.2967 | 4.2000 | 29.46 | 1.717360 |
| 13 | −98.7143 | ($d_{13}$) | | |
| 14 | 69.1437 | 1.5000 | 30.04 | 1.698950 |
| 15 | 45.3348 | 5.4000 | 64.10 | 1.516800 |
| 16 | −60.3961 | 0.2000 | | |
| 17 | 55.1470 | 5.8000 | 60.64 | 1.603110 |
| 18 | −40.8274 | 1.4000 | 33.89 | 1.803840 |
| 19 | −2639.0837 | ($d_{19}$) | | |
| 20 | 375.9165 | 2.3000 | 26.05 | 1.784702 |
| 21 | −73.2724 | 3.8000 | | |
| 22 | −63.9675 | 1.5000 | 46.80 | 1.766840 |
| 23 | 35.0298 | (Bf) | | |

Variable Space in Variable Power

| | Wide-Angle End | $M_1$ | $M_2$ | $M_3$ | Telephoto End |
|---|---|---|---|---|---|
| f | 76.50000 | 105.00000 | 150.00000 | 244.00000 | 292.00000 |
| $d_5$ | 2.68087 | 14.29144 | 30.56007 | 59.96616 | 72.63954 |
| $d_9$ | 3.11277 | 8.21826 | 12.08029 | 10.42422 | 4.33342 |
| $d_{13}$ | 51.64913 | 37.94691 | 20.92931 | 3.84730 | 3.98150 |
| $d_{19}$ | 25.00200 | 21.98816 | 18.87510 | 8.20709 | 1.49031 |
| Bf | 43.12718 | 55.24332 | 65.95329 | 85.69190 | 100.96932 |

TABLE 3

Values of Items f = 71.4 to 292.0 mm  $F_{NO}$ = 4.09 to 5.53
$f_1$ = 147.11811   $f_2$ = −169.99902   $f_3$ = −103.55843
$f_4$ = 46.22031    $f_5$ = −50.00000

Parameters

| Number | r | d | ν | $n_d$ |
|---|---|---|---|---|
| 1 | 224.9810 | 2.2000 | 33.89 | 1.803840 |
| 2 | 93.5518 | 6.8000 | 82.52 | 1.497820 |
| 3 | −530.0147 | 0.4000 | | |
| 4 | 92.1085 | 5.8000 | 64.10 | 1.516800 |
| 5 | 17809.6242 | ($d_5$) | | |
| 6 | −158.2396 | 1.7000 | 40.90 | 1.796310 |
| 7 | 48.1972 | 2.0000 | | |
| 8 | 36.7162 | 4.6000 | 31.08 | 1.688930 |
| 9 | 185.3984 | ($d_9$) | | |
| 10 | −58.8727 | 1.5000 | 40.90 | 1.796310 |
| 11 | 53.2911 | 1.6000 | | |
| 12 | 70.3233 | 4.4000 | 27.83 | 1.699110 |
| 13 | −91.1089 | ($d_{13}$) | | |
| 14 | 74.4018 | 2.0000 | 25.50 | 1.804581 |
| 15 | 39.7363 | 6.2000 | 60.23 | 1.518350 |
| 16 | −72.1866 | 0.2000 | | |
| 17 | 50.8262 | 6.0000 | 60.69 | 1.563840 |
| 18 | −48.0039 | 1.5000 | 33.89 | 1.803840 |

TABLE 3-continued

| 19 | −151.9661 | ($d_{19}$) | | |
|---|---|---|---|---|
| 20 | 207.9123 | 3.0000 | 27.83 | 1.699110 |
| 21 | −74.4884 | 3.8000 | | |
| 22 | −69.1994 | 1.5000 | 49.45 | 1.772789 |
| 23 | 32.9665 | (Bf) | | |

Variable Space in Variable Power

| | Wide-Angle End | $M_1$ | $M_2$ | $M_3$ | Telephoto End |
|---|---|---|---|---|---|
| f | 71.40000 | 92.00000 | 150.00000 | 247.00000 | 292.00000 |
| $d_5$ | 2.24237 | 10.61150 | 30.06716 | 58.68274 | 70.04168 |
| $d_9$ | 4.04337 | 8.38006 | 14.08602 | 12.52721 | 6.79451 |
| $d_{13}$ | 51.06705 | 40.61270 | 19.35950 | 2.77583 | 3.38298 |
| $d_{19}$ | 24.86161 | 22.61014 | 18.70172 | 8.22863 | 1.99522 |
| Bf | 40.27180 | 49.45001 | 64.46054 | 82.18415 | 95.47448 |

TABLE 4

| Embodiment Number | 1 | 2 | 3 |
|---|---|---|---|
| (1) $|\Delta X_{M1}|/(f_{M1} - f_w)$ | 0.0393 | 0.0178 | 0.0393 |
| (2) $|\Delta X_{M3}|/(f_T - f_{M3})$ | 0.0429 | 0.0543 | 0.0429 |
| (3) $F_T \cdot f_1/f_T$ | 2.79 | 2.84 | 2.79 |
| (4) $f_2/f_3$ | 1.64 | 1.45 | 1.64 |
| (5) $|f_{w23}|/f_w$ | 0.876 | 0.880 | 0.876 |
| (6) $|f_4/f_5|$ | 0.924 | 0.924 | 0.924 |

Figure 2:
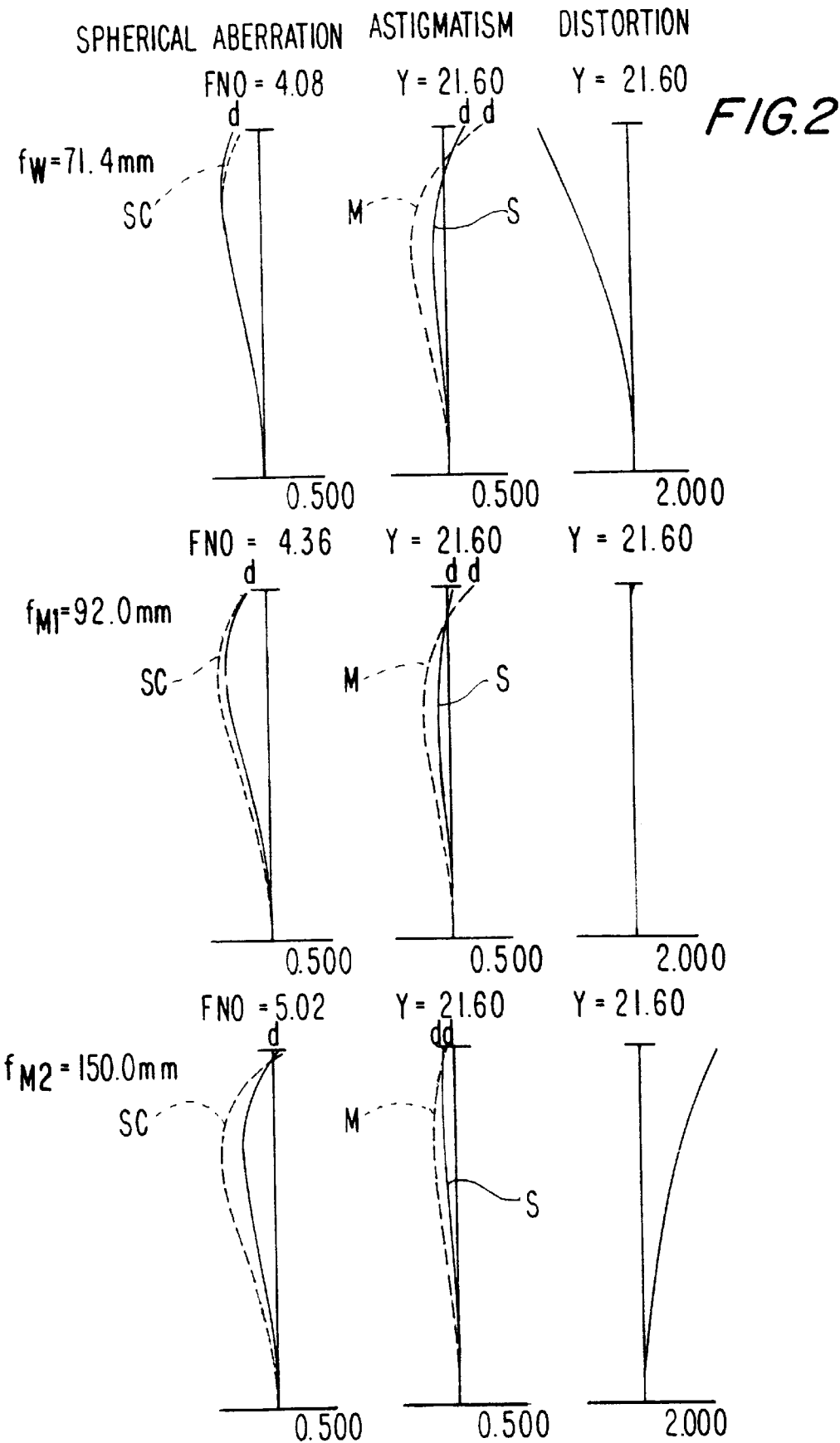
FIG. 2 shows various aberration diagrams at the wide-angle end, a first midpoint, and a second midpoint with respect to an infinitely far object measured in the first embodiment of FIG. 1.
Figure 3:
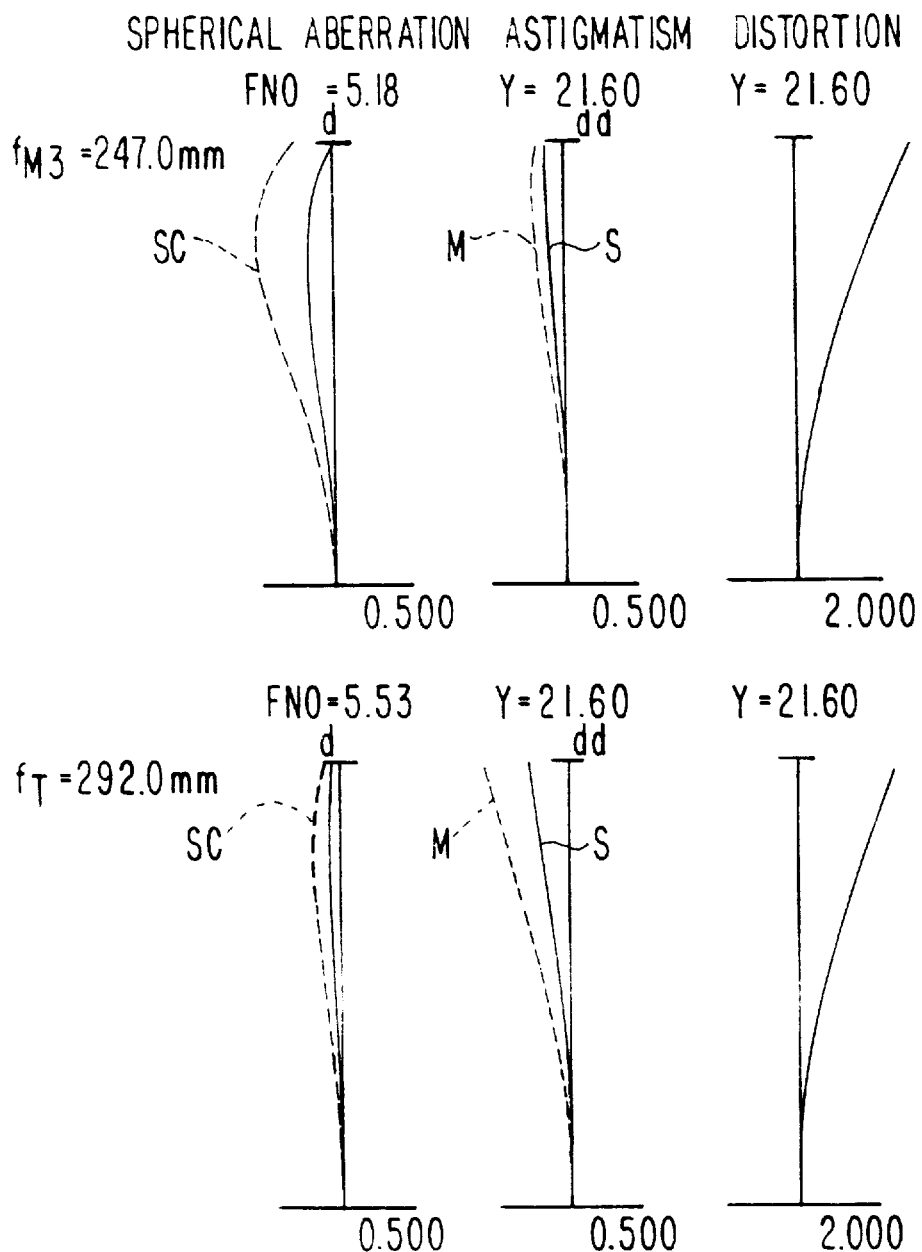
FIG. 3 shows various aberration diagrams at a third mid-point and at the telephoto end of the first embodiment of FIG. 1.
Figure 4:
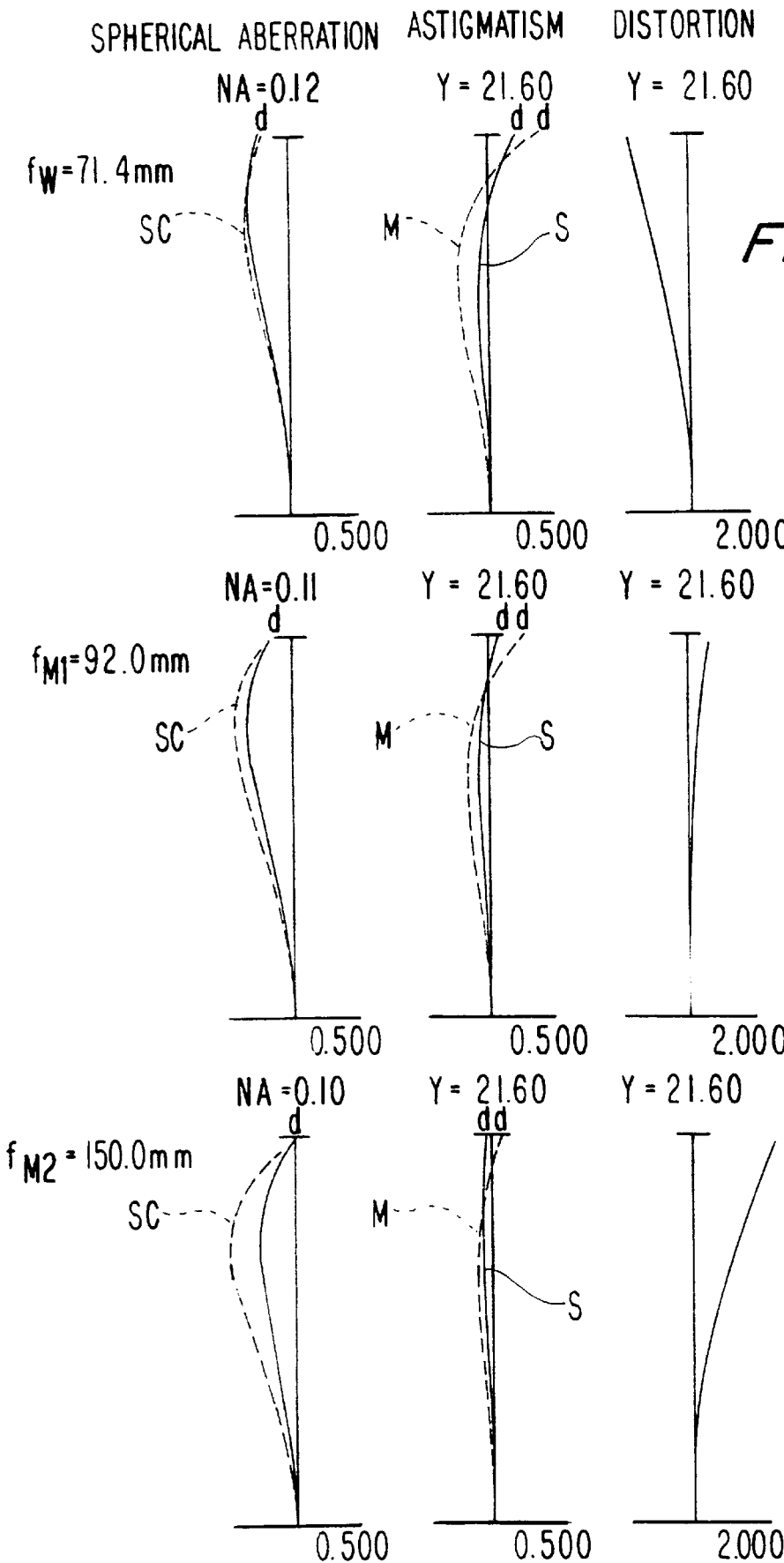
FIG. 4 shows various aberration diagrams measured at the wide-angle end, the first midpoint and the second midpoint at an image magnification of −1/30× in the first embodiment of FIG. 1.
Figure 5:
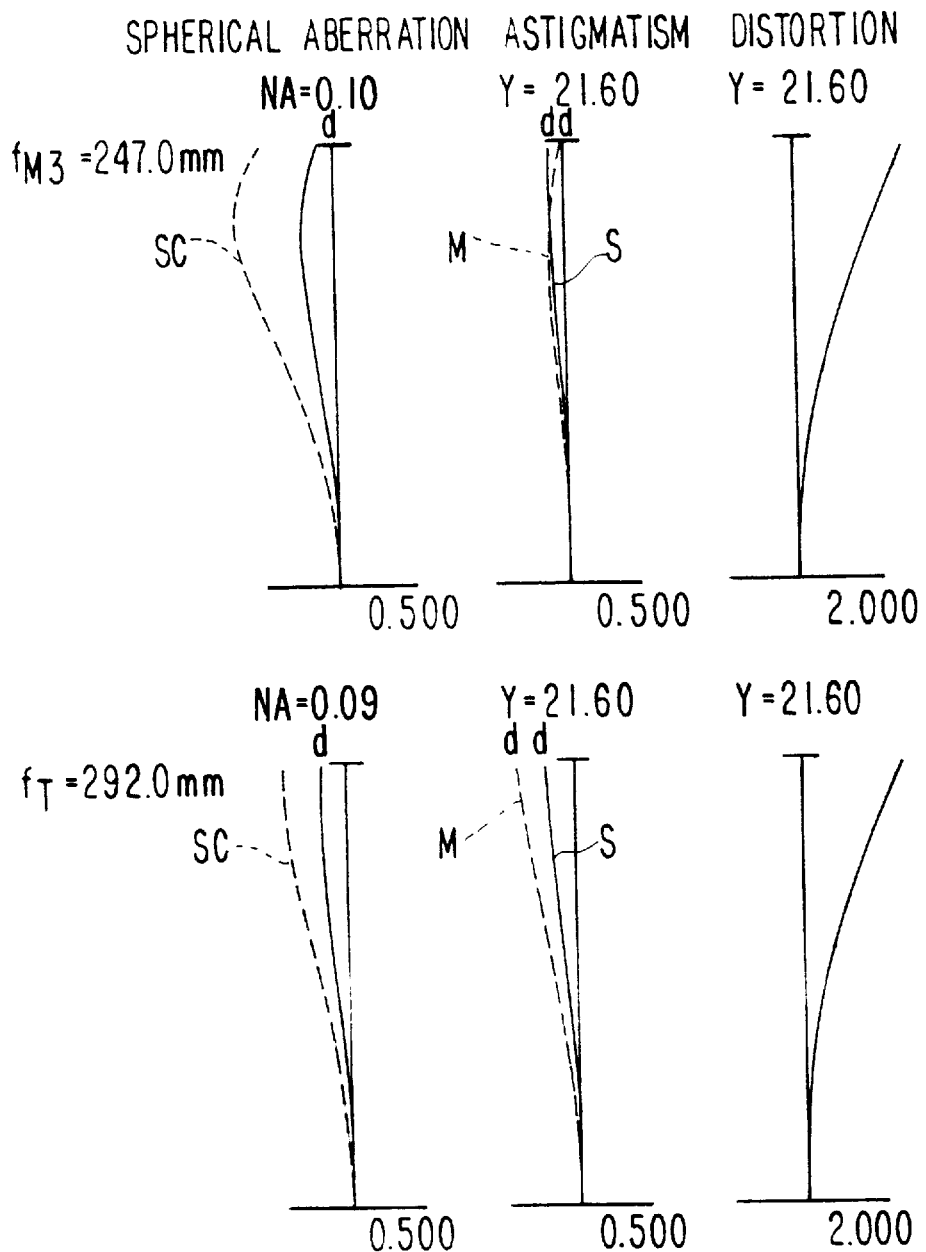
FIG. 5 shows various aberration diagrams measured at the third midpoint and at the telephoto end at an image magnification of −1/30× in the first embodiment of FIG. 1.
Figure 7:
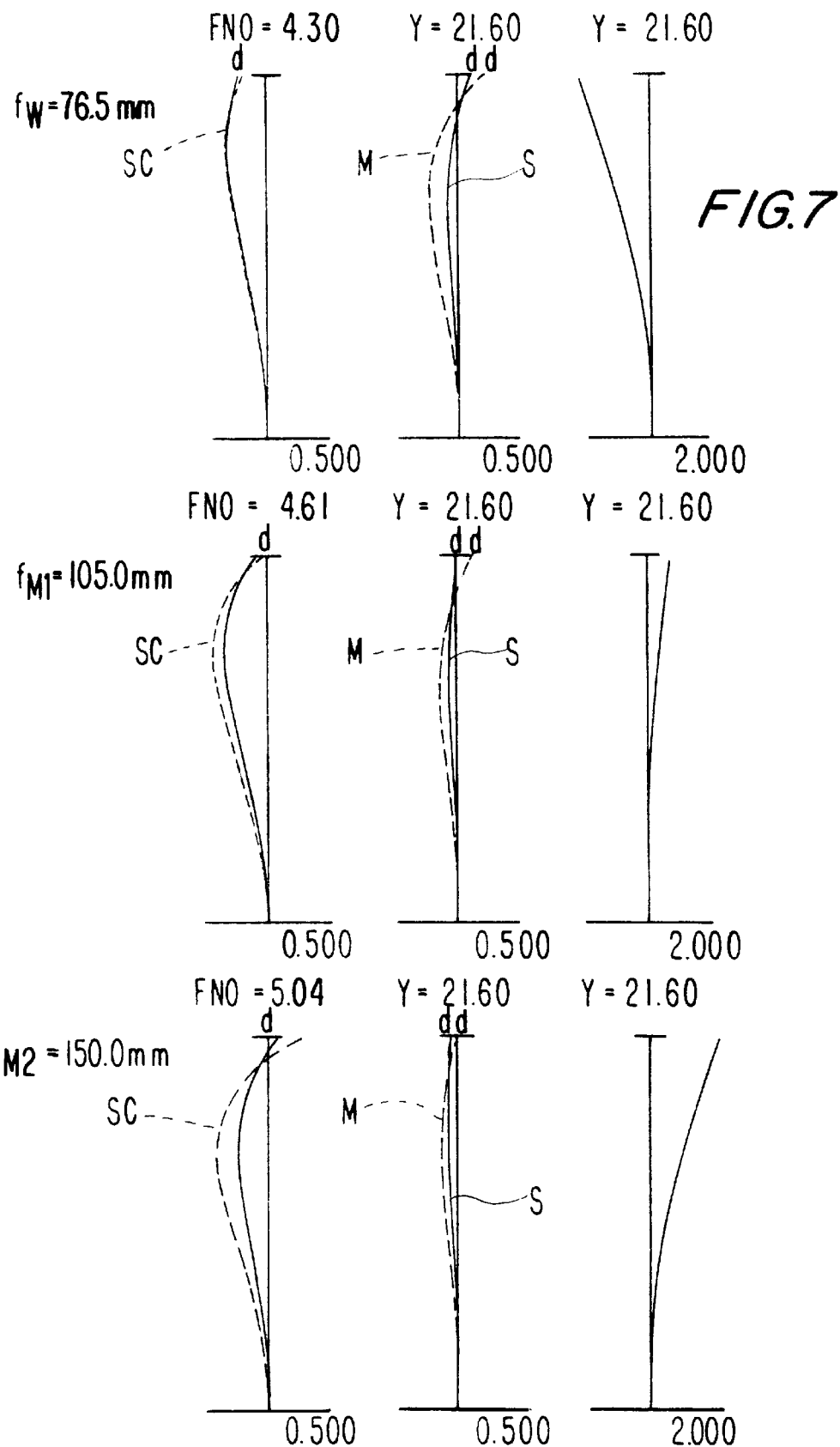
FIG. 7 shows various aberration diagrams measured at the wide-angle end, the first midpoint, and a second midpoint with respect to an infinitely far object in the second embodiment.
Figure 8:
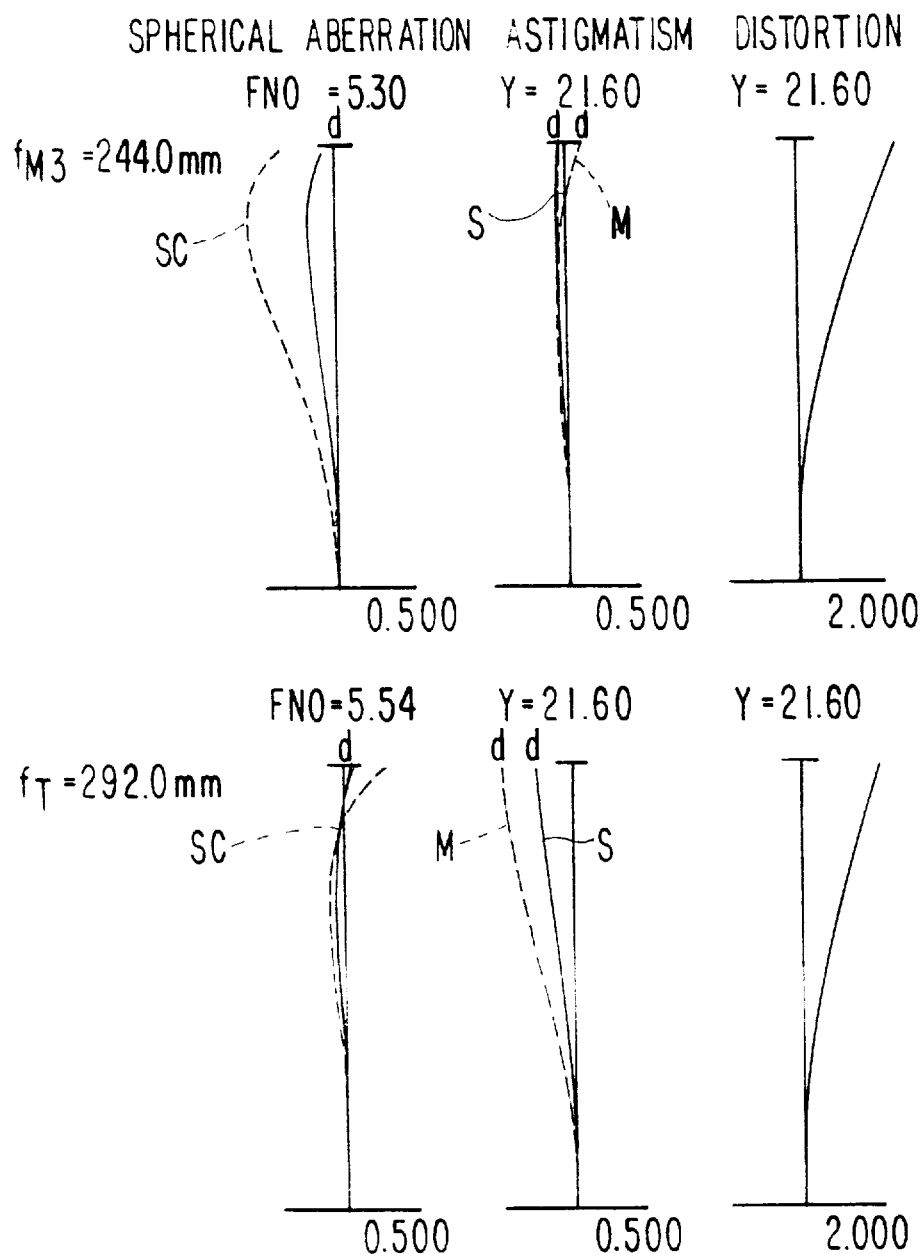
FIG. 8 shows various aberration diagrams measured at the third midpoint and at the telephoto end with respect to an infinitely far object in the second embodiment.
Figure 9:
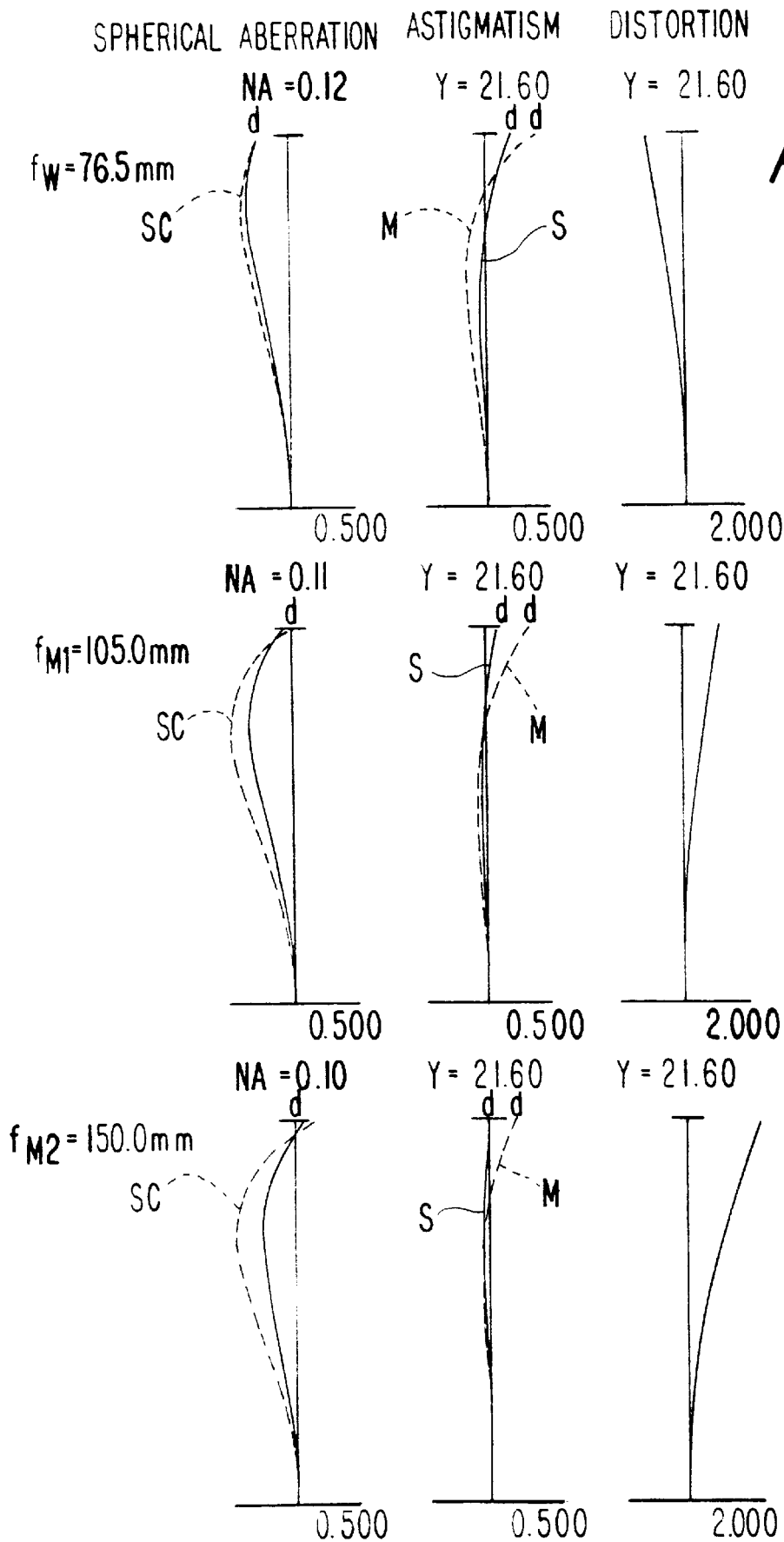
FIG. 9 shows various aberration diagrams measured at the wide-angle end, the first midpoint, and the second midpoint at an image magnification of −1/30× in the second embodiment.
Figure 10:
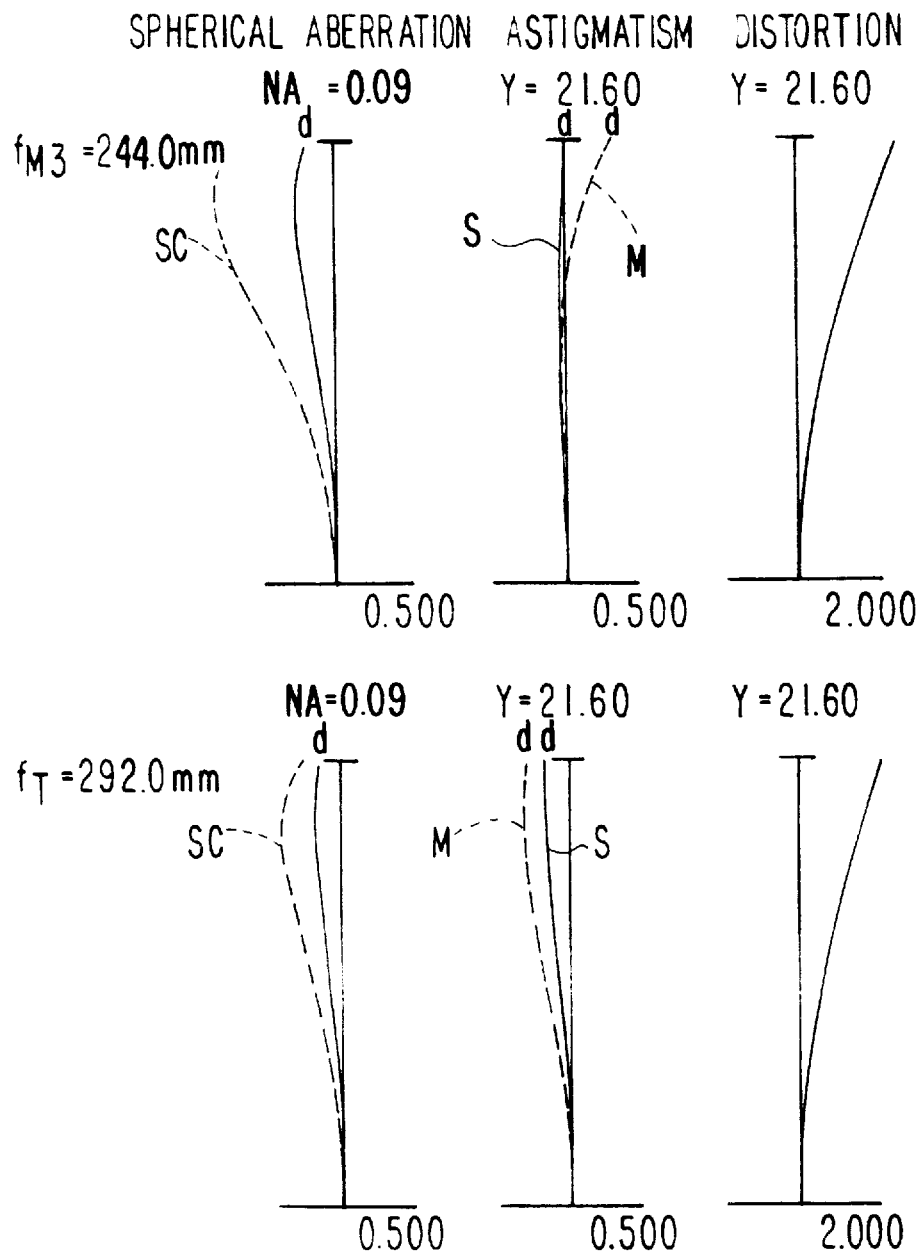
FIG. 10 shows various aberration diagrams measured at the third midpoint and at the telephoto end at an image magnification of −1/30× in the second embodiment.
Figure 12:
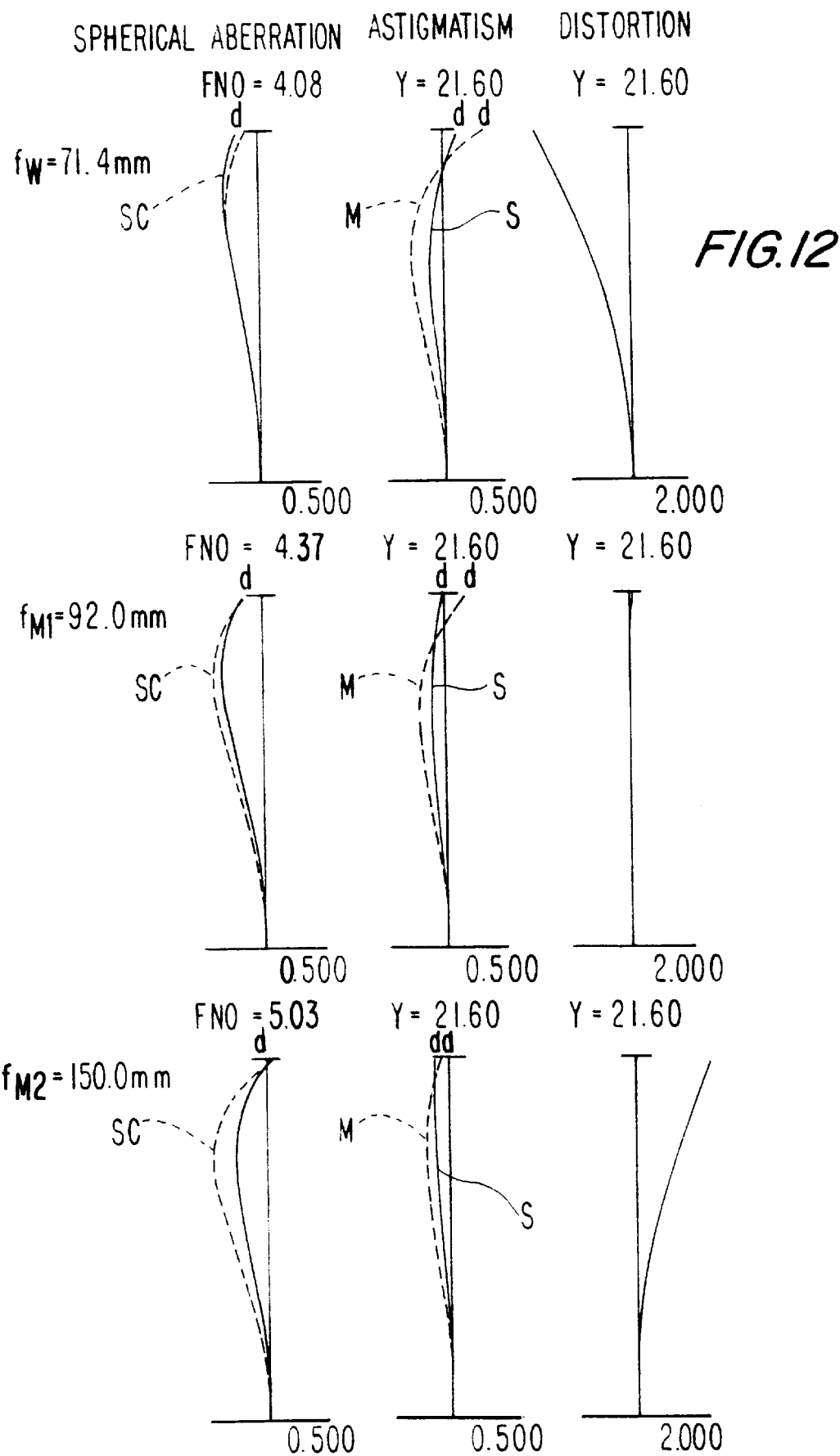
FIG. 12 shows various aberration diagrams measured at the wide-angle end, the first midpoint, and the second midpoint with respect to an infinitely far object measured in the third embodiment.
Figure 13:
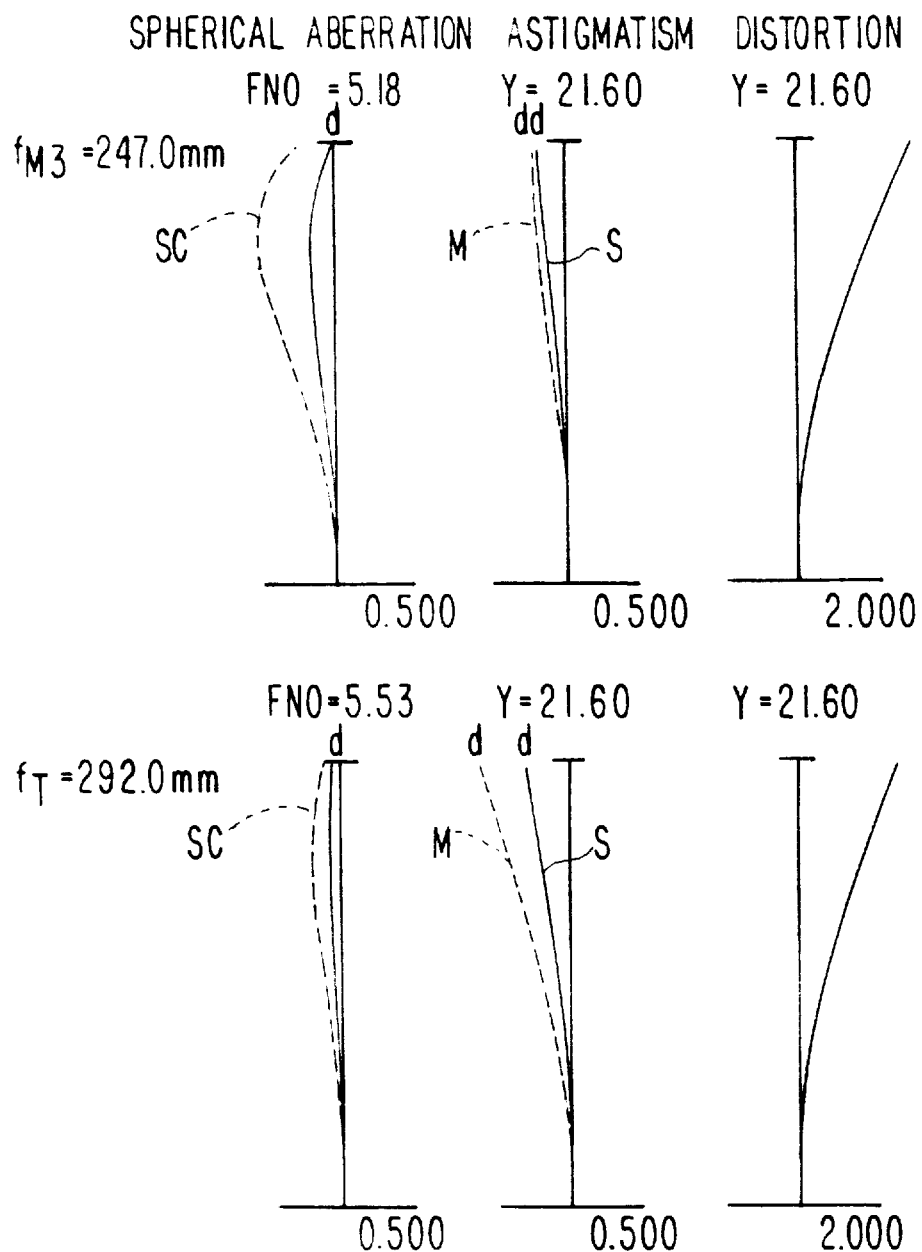
FIG. 13 shows various aberration diagrams measured at the third midpoint and at the telephoto end in the third embodiment.
Figure 14:
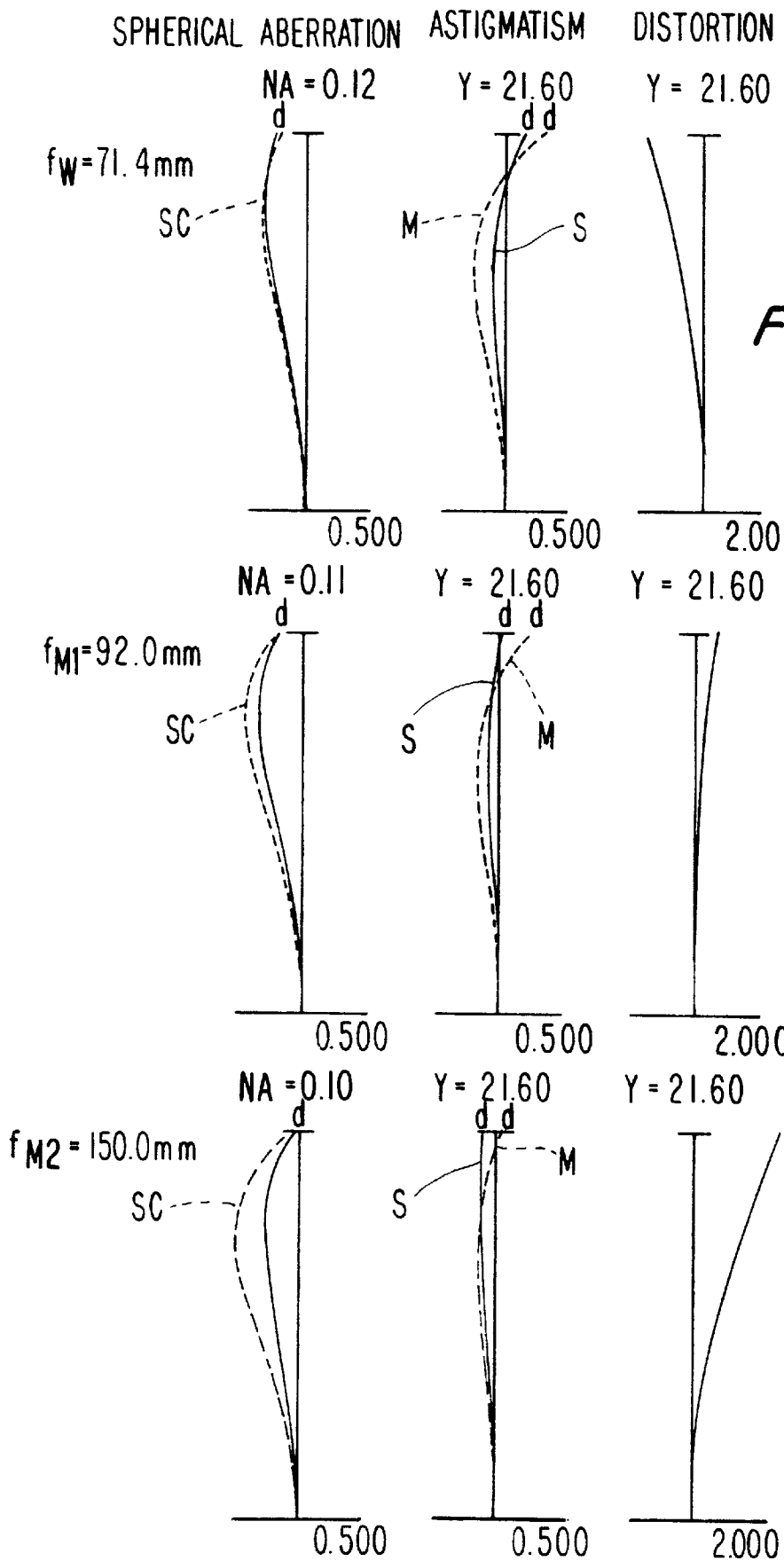
FIG. 14 shows various aberration diagrams measured at the wide-angle end, the first midpoint, and the second midpoint at an image magnification of −1/30× in the third embodiment.
Figure 15:
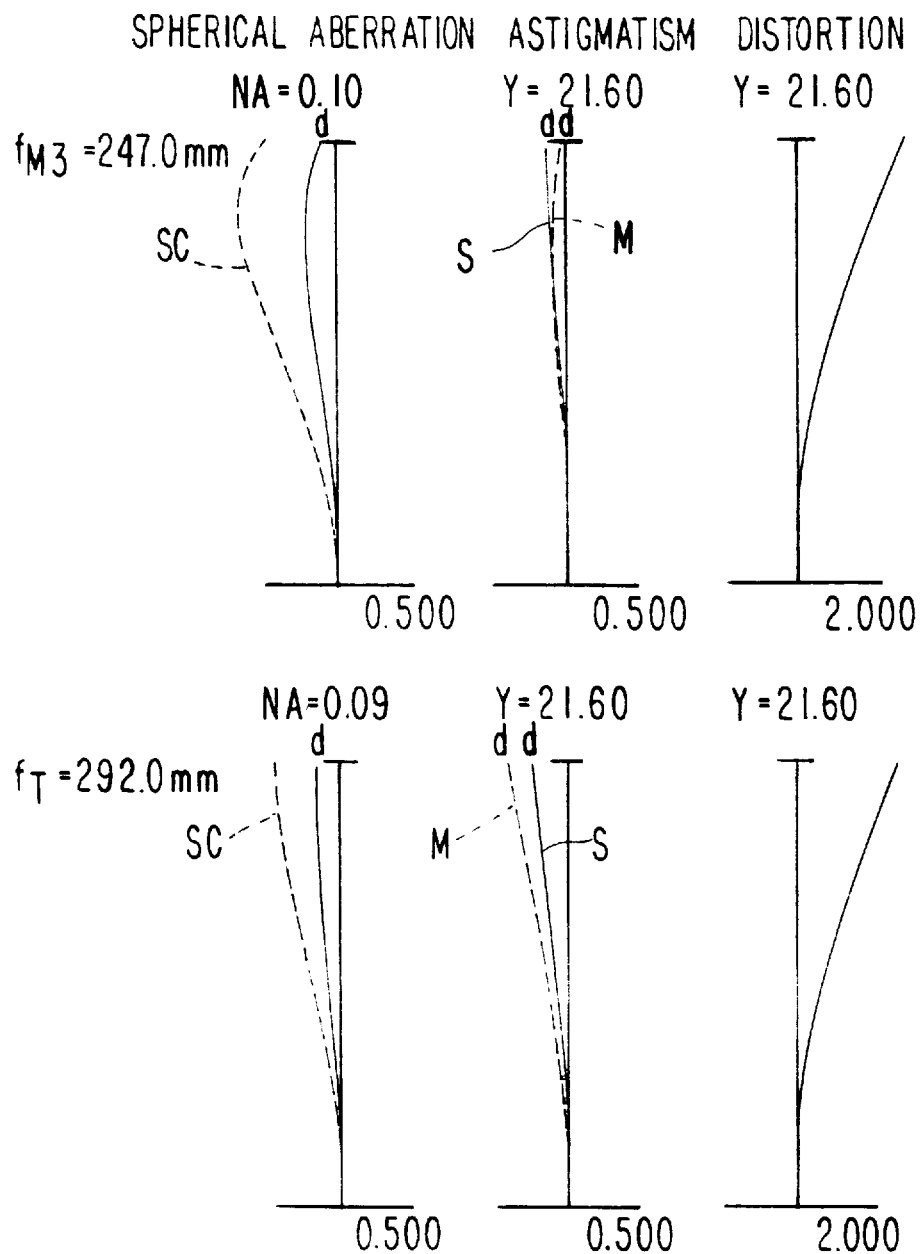
FIG. 15 shows various aberration diagrams measured at the third midpoint and at the telephoto end at an image magnification of −1/30× in the third embodiment.

FIGS. 2 and 3 show spherical aberration, astigmatism, distortion and the wide-angle end with respect to an infinitely far object at the first midpoint $M_1$, at the second midpoint $M_2$, the third midpoint $M_3$, and the telephoto end in the first embodiment. FIGS. 4 and 5 show various aberrations with respect to an infinitely far object measured at each of the focal lengths at an image magnification of −1/30× of the first embodiment. In the same manner, FIGS. 7 and 8 show various aberrations with respect to an infinitely far object measured at each of the focal lengths at an image magnification of −1/30× in the second embodiment; FIGS. 9 and 10 show various aberrations at each of the focal lengths at an image magnification of −1/30×. FIGS. 12 and 13 show various aberrations with respect to an infinitely far object measured at each of the focal lengths at an image magnification of −1/30× in the third embodiment; FIGS. 14 and 15 show various aberrations at each of the focal lengths at an image magnification of −1/30×. In the spherical aberration diagrams, sine condition (SC) is described. Also, in the astigmatism diagrams, a solid line denotes the sagittal image surface while a dotted line denotes the meridional image surface.

It is apparent from each of the figures that each of the embodiments provide excellent imaging performance at any of the object points at any of the focal lengths.

Various modifications will become possible for those skilled in the art after receiving the teachings of the present invention without departing from the scope thereof.

What is claimed is:

1. A telephoto zoom lens system comprising, in order from an object side:

a first lens group $G_1$ having a positive refractive power;

a second lens group $G_2$ having a negative refractive power;

a third lens group $G_3$ having a negative refractive power;

a fourth lens group $G_4$ having a positive refractive power;

a fifth lens group $G_5$ having a negative refractive power;

wherein when zooming from the wide-angle end to the telephoto end, the distance between each of the adjacent lens groups changes;

said second lens group $G_2$, when zooming from the wide-angle end to the telephoto end, first moves from the wide-angle end toward the object side, then moves toward the image side, and once again moves toward the object side to reach the telephoto end; and said second lens group $G_2$ is positioned closer to the image side at its telephoto end than it is at its wide-angle end.

2. A telephoto zoom lens system, as claimed in claim 1, which satisfies the following condition:

$$|\Delta X_{M1}|/(f_{M1}-f_W)<0.2$$

where $f_W$ is the focal length of the entire zoom lens system at the wide-angle end;

$f_{M1}$ is the focal length of the entire zoom lens system when said second lens group $G_2$ is positioned closest to the object side; and $\Delta X_{M1}$ is the distance between positions to which said second lens group $G_2$ is shifted, one being the wide-angle end and the other being closest to the object side.

3. A telephoto zoom lens system, as claimed in claim 1, which satisfies the following condition:

$$|\Delta X_{M3}|/(f_T-f_{M3})<0.2$$

where $f_T$ is the focal length of the entire zoom lens system at the telephoto end;

$f_{M3}$ is the focal length of the entire zoom lens system when said second lens group $G_2$ is positioned closest to the image side; and $\Delta X_{M3}$ is the distance between positions to which said second lens group $G_2$ is moved, one being the telephoto end and the other being closest to the image side.

4. A telephoto zoom lens system, as claimed in claim 1, which satisfies the following condition:

$$2.0<F_T \cdot f_1/f_T<3.6$$

where $f_T$ is the focal length of the entire zoom lens system at the telephoto end;

$f_1$ is the focal length of the first lens group $G_1$; and $F_T$ is the F-number at the telephoto end.

5. A telephoto zoom lens system, as claimed in claim 1, which satisfies the following condition:

$$1.0<f_2/f_3<2.0$$

where $f_2$ is the focal length of the second lens group $G_2$; and $f_3$ is the focal length of the third lens group $G_3$.

6. A telephoto zoom lens system, as claimed in claim 1, which satisfies the following condition:

$$0.6<|f_{w23}|/f_W<1.2$$

where $f_W$ is the focal length of the entire zoom lens system at the wide-angle end; and $f_{W23}$ is the synthetic focal length of the second lens group $G_2$ and the third lens group $G_3$ at the wide-angle end.

7. A telephoto zoom lens system, as claimed in claim 1, which satisfies the following condition:

$$0.6 < f_4/|f_5| < 1.2$$

where $f_4$ is the focal length of the fourth lens group $G_4$; and $f_5$ is the focal length of the fifth lens group $G_5$.

8. A telephoto zoom lens system, as claimed in claim 2, which satisfies the following conditions:

$$2.0 < F_T \cdot f_1/f_T < 3.6$$

$$1.0 < f_2/f_3 < 2.0$$

$$0.6 < |f_{W23}|/f_W < 1.2$$

$$0.6 < f_4/|f_5| < 1.2$$

where $f_1$ is the focal length of the first lens group $G_1$;

$f_2$ is the focal length of the second lens group $G_2$;

$f_3$ is the focal length of the third lens group $G_3$;

$f_4$ is the focal length of the fourth lens group $G_4$;

$f_5$ is the focal length of the fifth lens group $G_5$;

$f_{W23}$ is the synthetic focal length of the second lens group $G_2$ and the third lens group $G_3$ at the wide-angle end;

$f_W$ is the focal length of the entire zoom lens system at the wide-angle end;

$f_T$ is the focal length of the entire zoom lens system at the telephoto end; and $F_T$ is the F-number at the telephoto end.

9. A telephoto zoom lens system, as claimed in claim 3, which satisfies the following conditions:

$$2.0 < F_T \cdot f_1/f_T < 3.6$$

$$1.0 < f_2/f_3 < 2.0$$

$$0.6 < |f_{W23}|/f_W < 1.2$$

$$0.6 < f_4/|f_5| < 1.2$$

where $f_1$ is the focal length of the first lens group $G_1$;

$f_2$ is the focal length of the second lens group $G_2$;

$f_3$ is the focal length of the third lens group $G_3$;

$f_4$ is the focal length of the fourth lens group $G_4$;

$f_5$ is the focal length of the fifth lens group $G_5$;

$f_{W23}$ is the synthetic focal length of the second lens group $G_2$ and the third lens group $G_3$ at the wide-angle end;

$f_W$ is the focal length of the entire zoom lens system at the wide-angle end;

$f_T$ is the focal length of the entire zoom lens system at the telephoto end; and $F_T$ is the F-number at the telephoto end.

10. A telephoto zoom lens system, as claimed in claim 4, which satisfies the following condition:

$$1.0 < f_2/f_3 < 2.0$$

where $f_2$ is the focal length of the second lens group $G_2$; and $f_3$ is the focal length of the third lens group $G_3$.

11. A telephoto zoom lens system, as claimed in claim 4, which satisfies the following condition:

$$0.6 < |f_{W23}|/f_W < 1.2$$

where $f_W$ is the focal length of the entire zoom lens system at the wide-angle end; and $f_{W23}$ is the synthetic focal length of the second lens group $G_2$ and the third lens group $G_3$ at the wide-angle end.

12. A telephoto zoom lens system, as claimed in claim 4, which satisfies the following condition:

$$0.6 < f_4/|f_5| < 1.2$$

where $f_4$ is the focal length of the fourth lens group $G_4$; and $f_5$ is the focal length of the fifth lens group $G_5$.

13. A telephoto zoom lens system, as claimed in claim 5, which satisfies the following condition:

$$0.6 < |f_{W23}|/f_W < 1.2$$

where $f_W$ is the focal length of the entire zoom lens system at the wide-angle end; and $f_{W23}$ is the synthetic focal length of the second lens group $G_2$ and the third lens group $G_3$ at the wide-angle end.

14. A telephoto zoom lens system, as claimed in claim 5, which satisfies the following condition:

$$0.6 < f_4/|f_5| < 1.2$$

where $f_4$ is the focal length of the fourth lens group $G_4$; and $f_5$ is the focal length of the fifth lens group $G_5$.

15. A telephoto zoom lens system, as claimed in claim 10, which satisfies the following condition:

$$0.6 < |f_{W23}|/f_W < 1.2$$

where $f_W$ is the focal length of the entire zoom lens system at the wide-angle end; and $f_{W23}$ is the synthetic focal length of the second lens group $G_2$ and the third lens group $G_3$ at the wide-angle end.

16. A telephoto zoom lens system, as claimed in claim 10, which satisfies the following condition:

$$0.6 < f_4/|f_5| < 1.2$$

where $f_4$ is the focal length of the fourth lens group $G_4$; and $f_5$ is the focal length of the fifth lens group $G_5$.

17. A telephoto zoom lens system, as claimed in claim 15, which satisfies the following condition:

$$0.6 < f_4/|f_5| < 1.2$$

where $f_4$ is the focal length of the fourth lens group $G_4$; and $f_5$ is the focal length of the fifth lens group $G_5$.

18. A telephoto zoom lens system, as claimed in claim 11, which satisfies the following condition:

$$0.6 < f_4/|f_5| < 1.2$$

where $f_4$ is the focal length of the fourth lens group $G_4$; and $f_5$ is the focal length of the fifth lens group $G_5$.

19. A telephoto zoom lens system, as claimed in claim 13, which satisfies the following condition:

$$0.6 < f_4/|f_5| < 1.2$$

where $f_4$ is the focal length of the fourth lens group $G_4$; and
$f_5$ is the focal length of the fifth lens group $G_5$.

20. A telephoto zoom lens system, as claimed in claim 6, which satisfies the following condition:

$$0.6 < f_4/|f_5| < 1.2$$

where $f_4$ is the focal length of the fourth lens group $G_4$; and
$f_5$ is the focal length of the fifth lens group $G_5$.

21. A telephoto zoom lens system, as claimed in claim 2, which satisfies the following condition:

$$|\Delta X_{M3}|/(f_T - f_{M3}) < 0.2$$

where $f_T$ is the focal length of the entire zoom lens system at the telephoto end;
$f_{M3}$ is the focal length of the entire zoom lens system when said second lens group $G_2$ is positioned closest to the image side; and
$\Delta X_{M3}$ is the distance between positions to which said second lens group $G_2$ is moved, one being the telephoto end and the other being closest to the image side.

22. A telephoto zoom lens system, as claimed in claim 21, which satisfies the following conditions:

$$2.0 < F_T \cdot f_1/f_T < 3.6$$

$$1.0 < f_2/f_3 < 2.0$$

$$0.6 < |f_{W23}|/f_W < 1.2$$

$$0.6 < f_4/|f_5| < 1.2$$

where $f_1$ is the focal length of the first lens group $G_1$;
$f_2$ is the focal length of the second lens group $G_2$;
$f_3$ is the focal length of the third lens group $G_3$;
$f_4$ is the focal length of the fourth lens group $G_4$;
$f_5$ is the focal length of the fifth lens group $G_5$;
$f_{W23}$ is the synthetic focal length of the second lens group $G_2$ and the third lens group $G_3$ at the wide-angle end;
$f_W$ is the focal length of the entire zoom lens system at the wide-angle end;
$f_T$ is the focal length of the entire zoom lens system at the telephoto end; and
$F_T$ is the F-number at the telephoto end.

* * * * *